United States Patent
Kuwayama

(10) Patent No.: US 10,605,320 B2
(45) Date of Patent: Mar. 31, 2020

(54) DISC BRAKE ROTOR ASSEMBLY AND BRAKE SYSTEM

(71) Applicant: SHIMANO INC., Sakai (JP)

(72) Inventor: Kazuya Kuwayama, Sakai (JP)

(73) Assignee: SHIMANO INC., Sakai (JP)

(*) Notice: Subject to any disclaimer, the term of this patent is extended or adjusted under 35 U.S.C. 154(b) by 0 days.

(21) Appl. No.: 15/673,351

(22) Filed: Aug. 9, 2017

(65) Prior Publication Data

US 2019/0048952 A1     Feb. 14, 2019

(51) Int. Cl.
| | |
|---|---|
| *F16D 65/12* | (2006.01) |
| *F16D 66/00* | (2006.01) |
| *B62L 3/02* | (2006.01) |
| *B62L 1/00* | (2006.01) |
| *F16D 55/228* | (2006.01) |
| *B62J 99/00* | (2020.01) |
| *F16D 121/04* | (2012.01) |

(52) U.S. Cl.
CPC .............. *F16D 66/00* (2013.01); *B62L 1/005* (2013.01); *B62L 3/023* (2013.01); *F16D 55/228* (2013.01); *F16D 65/12* (2013.01); *B62J 2099/002* (2013.01); *F16D 65/123* (2013.01); *F16D 65/127* (2013.01); *F16D 2066/001* (2013.01); *F16D 2066/005* (2013.01); *F16D 2121/04* (2013.01)

(58) Field of Classification Search
CPC ....... B62L 1/005; G01L 1/22; B60B 27/0052; B60B 27/0068; F16D 66/027; F16D 65/12; F16D 65/123; F16D 65/125; F16D 65/128

USPC ..... 188/2 D, 17, 18 A, 218 XL; 73/862.338; 701/22, 70

See application file for complete search history.

(56) References Cited

U.S. PATENT DOCUMENTS

| | | | |
|---|---|---|---|
| 8,065,926 B2 | 11/2011 | Meyer | |
| 9,027,681 B2* | 5/2015 | Biderman | B60B 1/003 180/65.51 |
| 9,315,071 B2* | 4/2016 | Webber | B60B 1/041 |
| 2002/0120382 A1* | 8/2002 | Hatanaka | B60L 11/1803 701/70 |
| 2005/0183909 A1* | 8/2005 | Rau, III | F16D 65/0006 188/218 XL |
| 2006/0054424 A1* | 3/2006 | Inoue | B60T 8/52 188/18 R |
| 2010/0250082 A1* | 9/2010 | King | B60T 8/171 701/70 |
| 2011/0133542 A1* | 6/2011 | Ratti | B60B 1/003 301/6.5 |
| 2011/0210719 A1* | 9/2011 | Ishida | B60T 8/329 324/174 |
| 2012/0204658 A1* | 8/2012 | Mercat | B62M 6/50 73/862.338 |
| 2013/0049549 A1* | 2/2013 | Folmli | B62M 6/65 310/67 A |
| 2013/0054065 A1* | 2/2013 | Komatsu | B62M 6/45 701/22 |

(Continued)

FOREIGN PATENT DOCUMENTS

WO    WO2013/065153    5/2013

*Primary Examiner* — Christopher P Schwartz
(74) *Attorney, Agent, or Firm* — Mori & Ward, LLP

(57) ABSTRACT

A disc brake rotor assembly for a small vehicle including a bicycle comprises a disc brake rotor and at least one rotor state sensor to detect a state of the disc brake rotor.

18 Claims, 14 Drawing Sheets

(56) References Cited

U.S. PATENT DOCUMENTS

| | | | |
|---|---|---|---|
| 2014/0175857 A1* | 6/2014 | Mori | B60T 8/1706 |
| | | | 301/6.8 |
| 2014/0202262 A1* | 7/2014 | Mercat | B60B 27/023 |
| | | | 73/862.338 |
| 2017/0151829 A1* | 6/2017 | Neutsch | B60B 1/003 |
| 2017/0151833 A1* | 6/2017 | Neutsch | B60B 1/003 |
| 2018/0057107 A1* | 3/2018 | Yamamoto | B60B 27/0015 |
| 2018/0072096 A1* | 3/2018 | Shahana | G01P 3/481 |
| 2018/0201339 A1* | 7/2018 | Shahana | B62L 1/005 |

\* cited by examiner

DISC BRAKE ROTOR ASSEMBLY AND BRAKE SYSTEM

BACKGROUND OF THE INVENTION

Field of the Invention

The present invention relates to a disc brake rotor assembly and a brake system. More specifically, the present invention relates to a disc brake rotor and a brake system for a small vehicle including a bicycle.

Discussion of the Background

As an activity of a small vehicle, bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, some bicycles have been provided with a brake system including a disc brake rotor assembly.

SUMMARY OF THE INVENTION

In accordance with a first aspect of the present invention, a disc brake rotor assembly for a small vehicle including a bicycle comprises a disc brake rotor and at least one rotor state sensor to detect a state of the disc brake rotor.

With the disc brake rotor assembly according to the first aspect, it is possible to output information related to a rider's or driver's braking operation. Accordingly, riders or drivers can improve their braking abilities by using the disc brake rotor assembly.

In accordance with a second aspect of the present invention, the disc brake rotor assembly according to the first aspect is configured so that the at least one rotor state sensor is configured to detect a braking force applied to the disc brake rotor.

With the disc brake rotor assembly according to the second aspect, it is possible to detect the braking force. Accordingly, it can provide effective information for riders or drivers to improve their braking abilities.

In accordance with a third aspect of the present invention, the disc brake rotor assembly according to the first or second aspect is configured so that the disc brake rotor includes a rotor member and a hub mounting member to connect the rotor member to a hub of a small vehicle.

With the disc brake rotor assembly according to the third aspect, it is possible for the disc brake rotor to be connected to the hub of the small vehicle.

In accordance with a fourth aspect of the present invention, the disc brake rotor assembly according to the third aspect is configured so that the at least one rotor state sensor is attached to the hub mounting member.

With the disc brake rotor assembly according to the fourth aspect, the hub mounting member is more influenced than the rotor member in a condition where the braking force is applied to the disc brake rotor. Accordingly, it is possible to detect the braking force more effectively.

In accordance with a fifth aspect of the present invention, the disc brake rotor assembly according to the fourth aspect is configured so that the at least one rotor state sensor includes a strain gauge to detect a strain of the hub mounting member.

With the disc brake rotor assembly according to the fifth aspect, it is possible to detect the distortion of the hub mounting member due to the braking force.

In accordance with a sixth aspect of the present invention, the disc brake rotor assembly according to the fifth aspect is configured so that the at least one rotor state sensor includes a temperature sensor to detect a temperature of the strain gauge.

With the disc brake rotor assembly according to the sixth aspect, it is possible to calculate the distortion of the hub mounting member with cancelling an effect of frictional heat given to the strain gauge.

In accordance with a seventh aspect of the present invention, the disc brake rotor assembly according to any one of the fourth to sixth aspects is configured so that the rotor member is a separate member with respect to the hub mounting member. The rotor member is attached to the hub mounting member by a fastener.

With the disc brake rotor assembly according to the seventh aspect, it is possible to easily manufacture the disc brake rotor.

In accordance with an eighth aspect of the present invention, the disc brake rotor assembly according to any one of the third to seventh aspects is configured so that the at least one rotor state sensor includes a temperature sensor to detect a temperature of at least one of the rotor member and the hub mounting member.

With the disc brake rotor assembly according to the eighth aspect, it is possible to calculate the state of the disc brake rotor by using the temperature detected by the temperature sensor.

In accordance with a ninth aspect of the present invention, the disc brake rotor assembly according to any one of the first to eighth aspects further comprises a wireless communicator to output information of the state of the disc brake rotor.

With the disc brake rotor assembly according to the ninth aspect, it is possible to transmit the information of the state of the disc brake rotor to a different terminal (e.g. an electric device).

In accordance with a tenth aspect of the present invention, the disc brake rotor assembly according to the ninth aspect further comprises a battery to supply electric power to the wireless communicator and the at least one rotor state sensor.

With the disc brake rotor assembly according to the tenth aspect, it is possible to detect the state of the disc brake rotor and to output the information of the state of the disc brake rotor.

In accordance with an eleventh aspect of the present invention, the disc brake rotor assembly according to the tenth aspect further comprises a housing to accommodate at least one of the battery and the wireless communicator.

With the disc brake rotor assembly according to the eleventh aspect, it is possible to protect at least one of the battery and the wireless communicator against dust and water.

In accordance with a twelfth aspect of the present invention, the disc brake rotor assembly according to the eleventh aspect is configured so that the housing accommodates the battery and the wireless communicator.

With the disc brake rotor assembly according to the twelfth aspect, it is possible to protect the battery and the wireless communicator against dust and water.

In accordance with a thirteenth aspect of the present invention, the disc brake rotor assembly according to the eleventh or twelfth aspect is configured so that the housing is attached to the hub mounting member.

With the disc brake rotor assembly according to the thirteenth aspect, it is possible to easily access the housing.

In accordance with a fourteenth aspect of the present invention, the disc brake rotor assembly according to the eleventh or twelfth aspect further comprises a hub having a cavity in which the housing is provided.

With the disc brake rotor assembly according to the fourteenth aspect, it is possible to utilize the cavity in the hub to reduce a size of a structure close to the at least one rotor state sensor.

In accordance with a fifteenth aspect of the present invention, the disc brake rotor assembly according to the fourteenth aspect further comprises a first terminal electrically connected to the housing and a second terminal electrically connected to the at least one rotor state sensor and the first terminal.

With the disc brake rotor assembly according to the fifteenth aspect, it is possible to electrically connect the housing in the hub and at least one rotor state sensor provided on the disc brake rotor.

In accordance with a sixteenth aspect of the present invention, the disc brake rotor assembly according to the fifteenth aspect is configured so that the hub has an outer serration portion to which the first terminal is attached. The disc brake rotor has an inner serration portion to which the second terminal is attached. The inner serration portion is configured to engage with the outer serration portion.

With the disc brake rotor assembly according to the sixteenth aspect, it is possible to electrically connect the housing in the hub and at least one rotor state sensor provided on the disc brake rotor.

In accordance with a seventeenth aspect of the present invention, a brake system comprises the disc brake rotor assembly according to any one of the first to sixteenth aspects and an electric device including an output interface through which the state of the disc brake rotor is output.

With the brake system according to the seventeenth aspect, it is possible to notify the state of the disc brake rotor to a rider or driver.

In accordance with an eighteenth aspect of the present invention, the brake system according to the seventeenth aspect is configured so that the disc brake rotor assembly further comprises a wireless communicator to transmit information of the state of the disc brake rotor to the electric device.

With the brake system according to the eighteenth aspect, it is possible to notify the state of the disc brake rotor to a rider or driver and/or to save information of the state of the disc brake rotor for future use.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
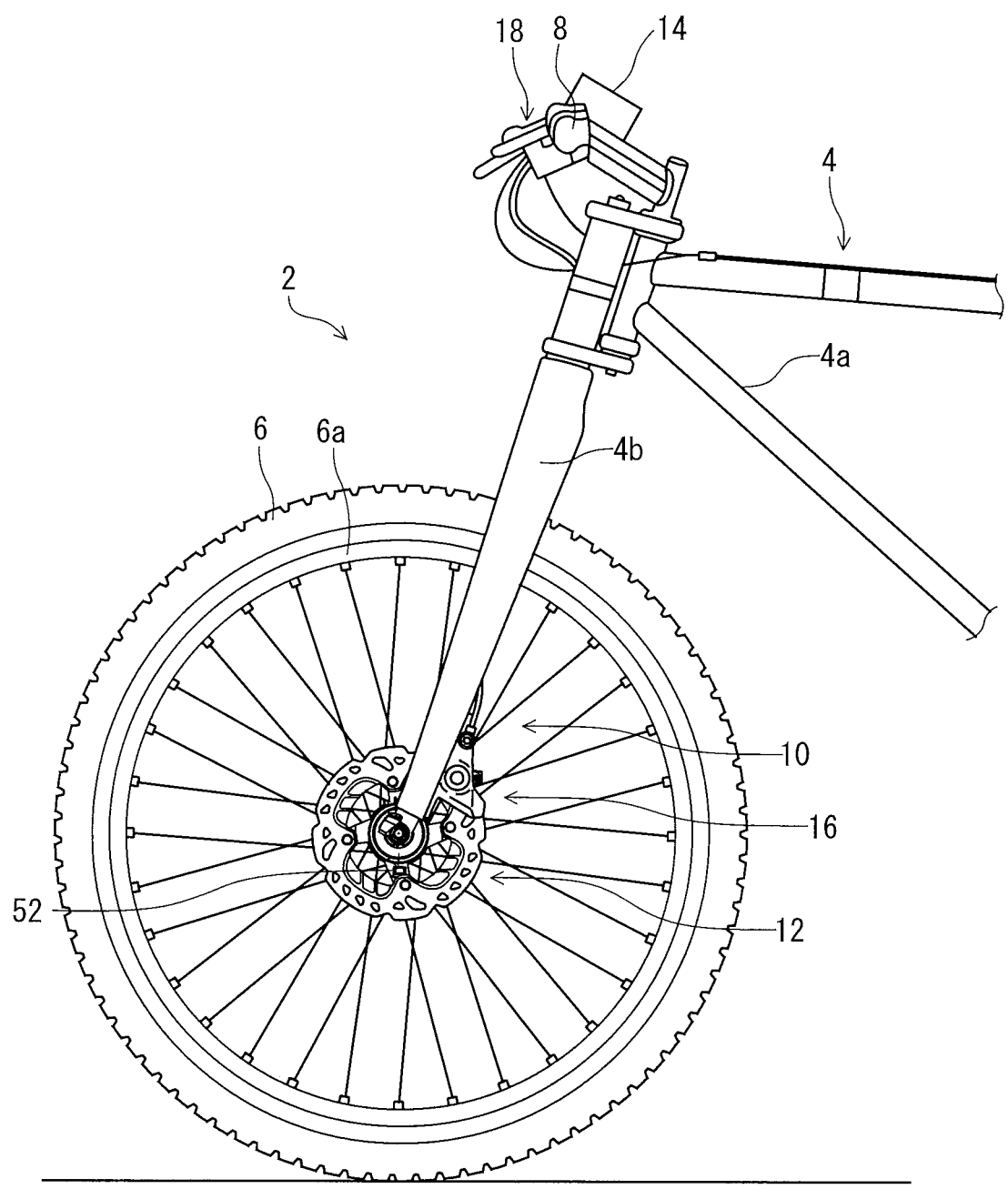
FIG. 1 is a left side elevational view of a front portion of a bicycle with a disc brake rotor assembly in accordance with a first embodiment of the present invention.

The embodiments will now be described with reference to the accompanying drawings, wherein like reference numerals designate corresponding or identical elements throughout the various drawings.

First Embodiment

Referring initially to FIG. 1, a brake system 10 is illustrated. The brake system 10 includes a disc brake rotor assembly 12 for a small vehicle including a bicycle 2 and an electric device 14. The bicycle 2 includes a bicycle frame 4, a front wheel 6, a rear wheel (not shown), and a drive train (not shown). The bicycle frame 4 includes a main frame 4a and a front fork 4b. The front wheel 6 is rotatably supported by the front fork 4b. The rear wheel is rotatably supported by a rear end of the main frame 4a. Here, small vehicles as used herein refers to electric vehicles and muscular driven vehicles including electric assisted vehicles regardless of the number of their wheels, but does not include vehicles that require a license to operate on public roads. In the following description, the bicycle 2 can be referred to as the small vehicle 2.

The brake system 10 further includes a brake caliper assembly 16 and a brake operating device 18. In the first embodiment, the following directional terms "front", "rear", "forward", "rearward", "left", "right", "upward" and "downward" as well as any other similar directional terms refer to those directions which are determined based on a rider or driver who sits on a saddle (not shown) of the bicycle 2 with facing a handlebar 8. Accordingly, these terms, as utilized to describe the disc brake rotor assembly (a bicycle disc brake rotor assembly) 12 should be interpreted relative to the bicycle 2 equipped with the disc brake rotor assembly 12 as used in an upright riding position on a horizontal surface. These definitions can be applied to other embodiments.

Figure 2:
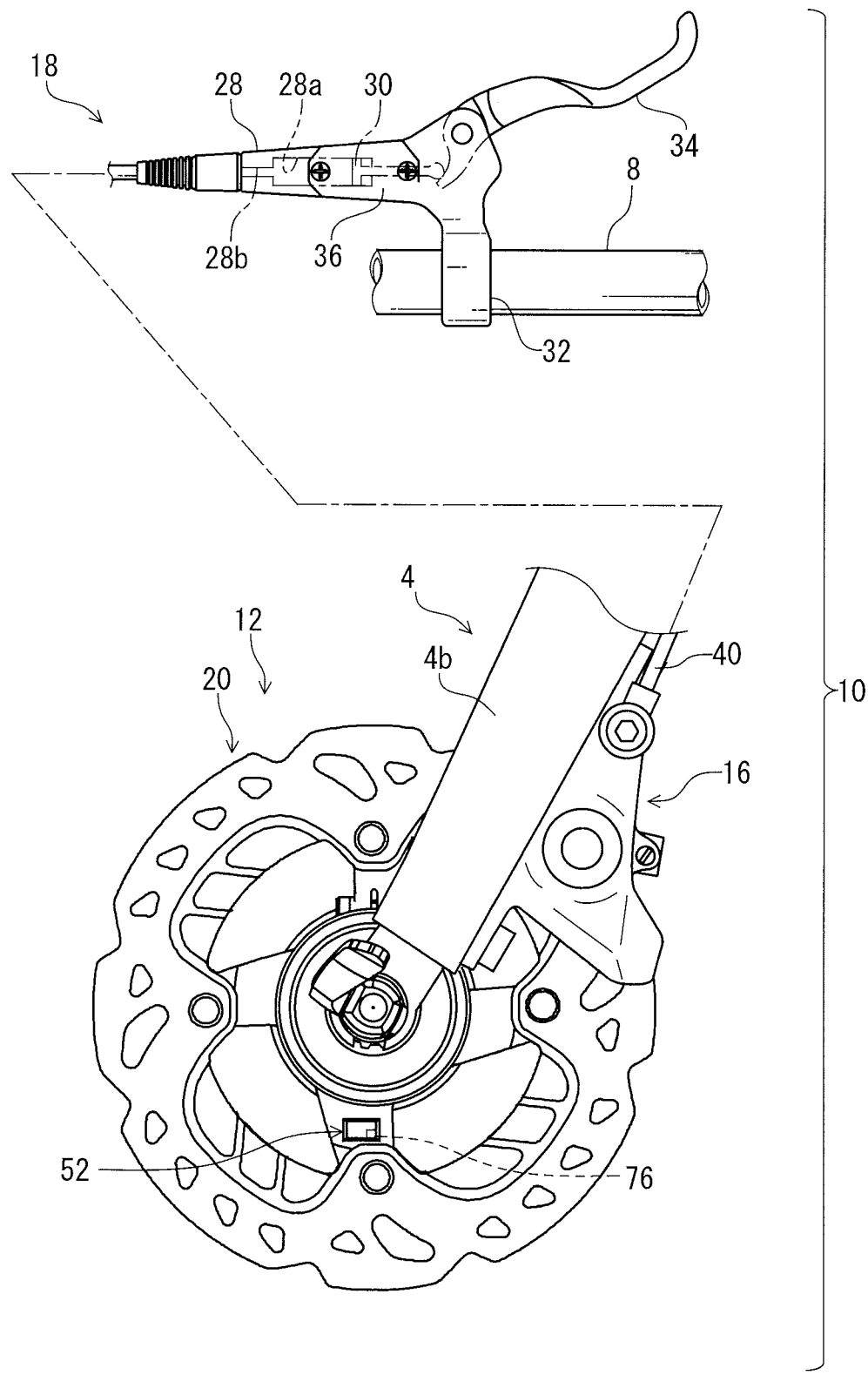
FIG. 2 is a partial side elevational view of a disc brake device with the disc brake rotor assembly in accordance with the first embodiment.

Referring to FIG. 2, the brake caliper assembly 16 is mounted to the front fork 4b of the bicycle frame 4. It will be apparent to those skilled in a small vehicle field, in particular a bicycle field that the brake caliper assembly 16 can be mounted to the main frame 4a for the rear wheel. The disc brake rotor assembly 12 comprises a disc brake rotor 20. The brake operating device 18 is configured to actuate the brake caliper assembly 16 to apply a braking force on the disc brake rotor 20.

As illustrated in FIG. 2, the brake operating device 18 includes a master cylinder 28, a master piston 30, a clamp 32, a brake lever 34, and a hydraulic fluid reservoir 36. The brake operating device 18 is mounted on the handlebar 8 via the clamp 32. The master cylinder 28 includes a master cylinder bore 28a in which the master piston 30 is movably disposed. The brake lever 34 is pivotally coupled to the master cylinder 28 for operating the brake caliper assembly 16. The brake lever 34 is operatively coupled to the master piston 30 such that the master piston 30 is movable in the master cylinder bore 28a in response to the pivotal movement of the brake lever 34. The hydraulic fluid reservoir 36 is in fluid communication with the master cylinder bore 28a. The master cylinder 28 and the hydraulic fluid reservoir 36 contain hydraulic fluid such as mineral oil. The master cylinder 28 has an outlet port 28b for supplying hydraulic fluid to the brake caliper assembly 16 via a hydraulic brake hose 40.

Figure 3:
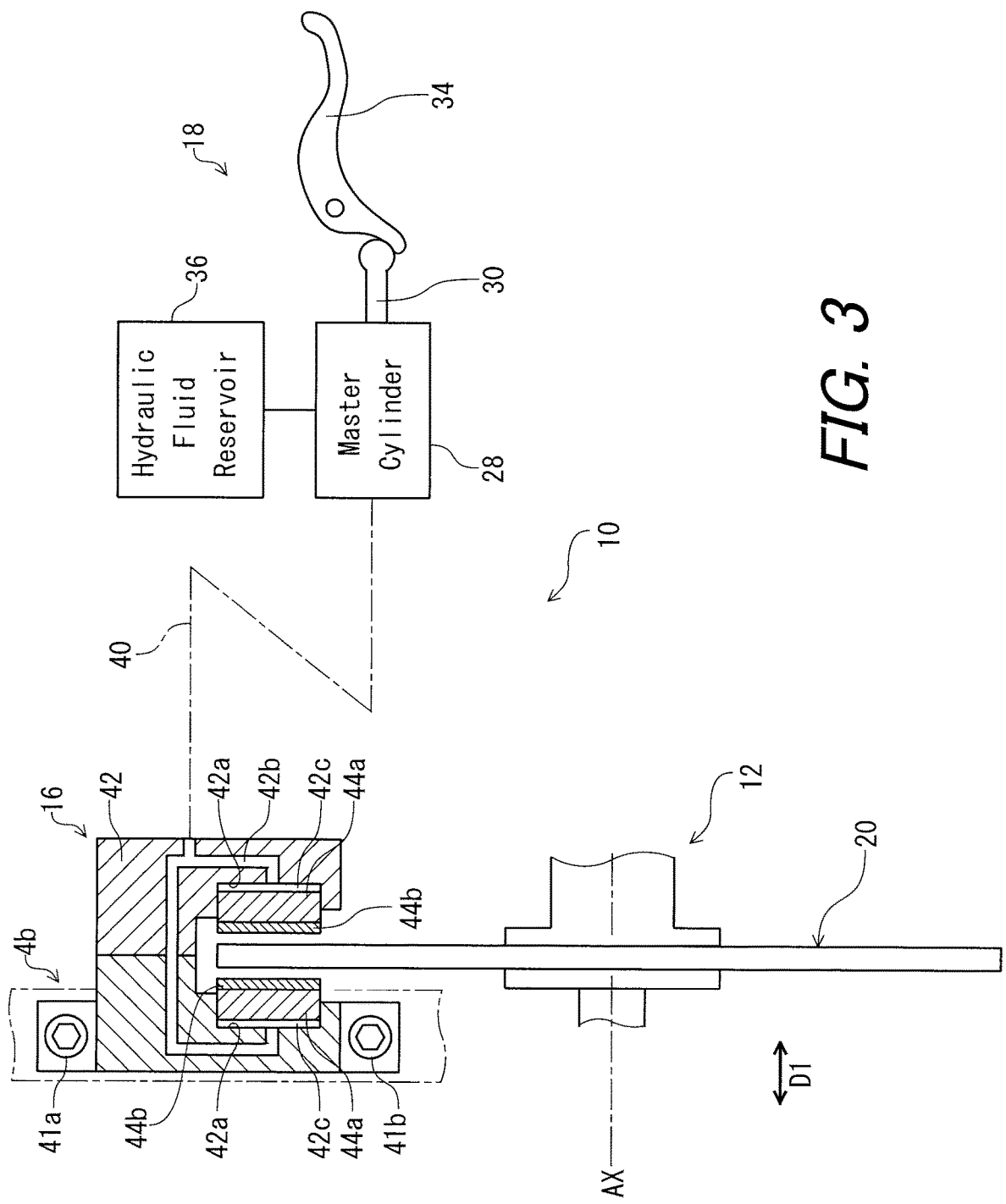
FIG. 3 is a schematic structural diagram of the disc brake device illustrated in FIG. 2.

Referring to FIG. 3, the brake caliper assembly 16 is attached to the front fork 4b by bolts 41a and 41b. The brake caliper assembly 16 is configured to apply a braking force on the disc brake rotor 20 of the disc brake rotor assembly 12. The brake caliper assembly 16 includes a caliper housing 42, a pair of pistons 44a, and a pair of brake pads 44b. The pistons 44a are arranged to press the brake pads 44b toward the disc brake rotor 20 respectively. The caliper housing 42 includes a pair of cylinders 42a and a caliper fluid passage 42b. The pistons 44a are disposed within the cylinders 42a to be movable in an axial direction D1 of the disc brake rotor 20 respectively. The fluid chambers 42c are defined by the pistons 44a and the cylinders 42a. The fluid chambers 42c are in fluid communication with the caliper fluid passage 42b. The caliper fluid passage 42b is in fluid communication with the master cylinder 28 via the hydraulic brake hose 40.

The master piston 30 moves within the master cylinder 28 in response to the pivotal movement of the brake lever 34, which allows the hydraulic fluid to move through the hydraulic brake hose 40 connected to the brake caliper assembly 16. The hydraulic fluid moves the pistons 44a to press the brake pads 44b against the disc brake rotor assembly 12, applying the braking force to the disc brake rotor assembly 12.

Figure 4:
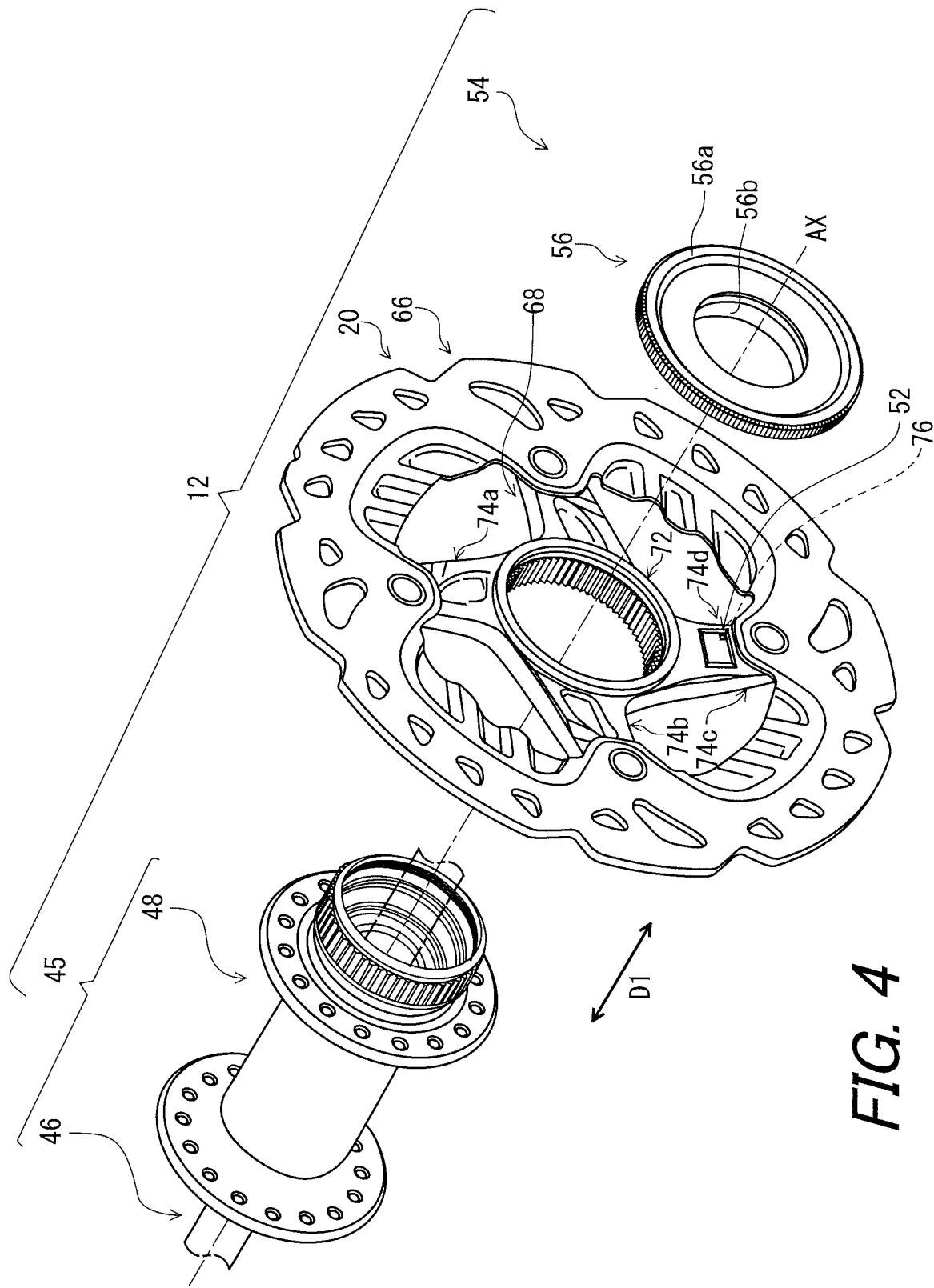
FIG. 4 is an exploded perspective view of the disc brake rotor assembly illustrated in FIG. 3.

As illustrated in FIG. 4, the disc brake rotor assembly 12 is included in the front wheel 6 and further comprises a hub axle 46, a hub shell 48, a sensor module 52, and a fixing structure 54. In the following description, the hub axle 46 and the hub shell 48 can be collectively referred to as a hub 45. The hub axle 46 extends in the axial direction D1 and is configured to be attached to the front fork 4b of the bicycle frame 4. The axial direction D1 is defined along a rotational axis AX of the disc brake rotor assembly 12. The hub shell 48 is configured to rotate around the hub axle 46. More specifically, the hub shell 48 is configured to be rotatably mounted to the hub axle 46 about the rotational axis AX. The hub axle 46 and hub shell 48 are configured to rotatably attach the front wheel 6 (FIG. 1) to the front fork 4b. The disc brake rotor 20 is attached to the hub shell 48 to be rotatable integrally with the hub shell 48 about the rotational axis AX. The fixing structure 54 is configured to fix the disc brake rotor 20 to the hub shell 48. The fixing structure 54 includes a locking member 56. The locking member 56 is configured to be attached to the hub shell 48. The locking member 56 includes the flange portion 56a and a tubular portion 56b. The tubular portion 56b has a screw thread (not shown) at an outer peripheral surface of the tubular portion 56b.

Figure 5:
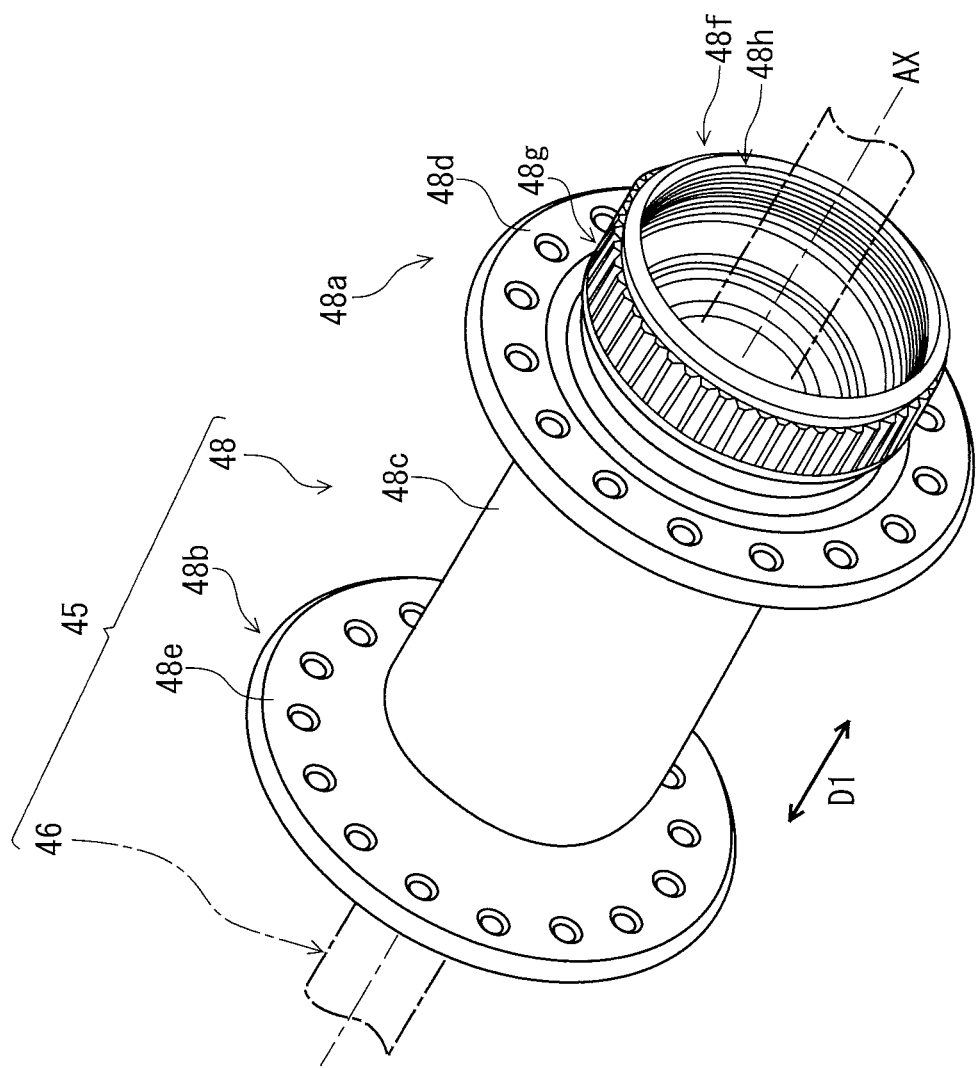
FIG. 5 is a perspective view of a hub shell provided in the disc brake rotor assembly illustrated in FIG. 4.

As illustrated in FIG. 5, the hub shell 48 is a substantially tubular member and is preferably made of metallic material such as aluminum alloy or stainless steel. The hub shell 48 extends in the axial direction D1. The hub shell 48 includes a first end portion 48a, a second end portion 48b opposite to the first end portion 48a in the axial direction D1, and a center tubular portion 48c. In the illustrated embodiment, the first end portion 48a, the second end portion 48b and the center tubular portion 48c are integrally provided as a one-piece unitary member. The center tubular portion 48c has a tubular shape and extends in the axial direction D1 between the first end portion 48a and the second end portion 48b. The first end portion 48a has a hub flange portion 48d and the second end portion 48b has a hub flange portion 48e. The hub flange portions 48d and 48e protrude radially outward with respect to the hub axle 46. The hub flange portions 48d and 48e are configured to be connected to a rim 6a of the front wheel 6 (FIG. 1) via spokes so that the front wheel 6 is rotatable about the hub axle 46.

As illustrated in FIG. 5, the first end portion 48a further has an end tubular portion 48f, an outer serration portion 48g, and a threaded hole 48h. The end tubular portion 48f is arranged at an opposite side of the center tubular portion 48c with respect to the hub flange portion 48d. The end tubular portion 48f extends from the hub flange portion 48d in the axial direction D1. The outer serration portion 48g is provided on an outer circumferential surface of the end tubular portion 48f. The threaded hole 48h is provided at the first end portion 48a and is provided on an inner circumferential surface of the end tubular portion 48f.

Figure 6:
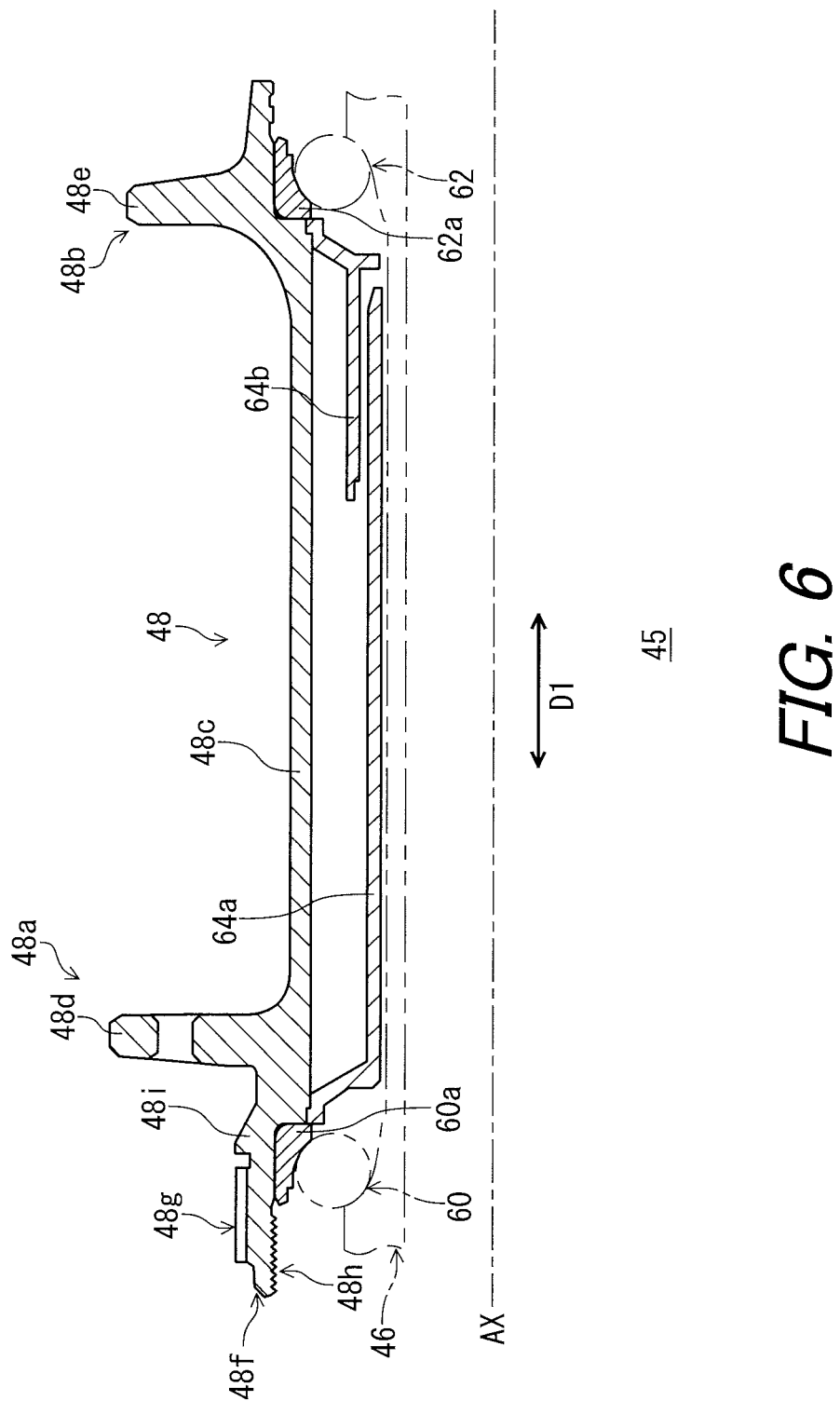
FIG. 6 is a partial cross-sectional view of the hub shell illustrated in FIG. 5.

As illustrated in FIG. 6, the hub shell 48 further includes an annular abutment flange 48i protruding radially outward from the end tubular portion 48f. The annular abutment flange 48i is provided at the first end portion 48a of the hub shell 48 and is provided on the outer circumferential surface of the end tubular portion 48f. The annular abutment flange 48i is disposed between the hub flange portion 48d and the outer serration portion 48g in the axial direction D1. The annular abutment flange 48i is contactable with the disc brake rotor 20 in the axial direction D1. Threadly engaging the tubular portion 56b of the locking member 56 to the threaded hole 48h of the hub shell 48, the disc brake rotor 20 is fixed to the hub shell 48 between the flange portion 56a of the locking member 56 and the annular abutment flange 48i of the hub shell 48.

As seen in FIG. 6, the hub axle 46 extends through the hub shell 48 in the axial direction D1 and is secured to the front fork 4b. The hub shell 48 is rotatably supported by the hub axle 46 via a first bearing 60 and a second bearing 62. An outer race 60a of the first bearing 60 is fitted in the end tubular portion 48f. The outer race 60a is located between the center tubular portion 48c and the threaded hole 48h in the axial direction D1. An outer race 62a of the second bearing 62 is fitted in the second end portion 48b of the hub shell 48. A first inner tubular member 64a and a second inner tubular member 64b are provided inside the hub shell 48 to prevent grease loss.

Figure 7:
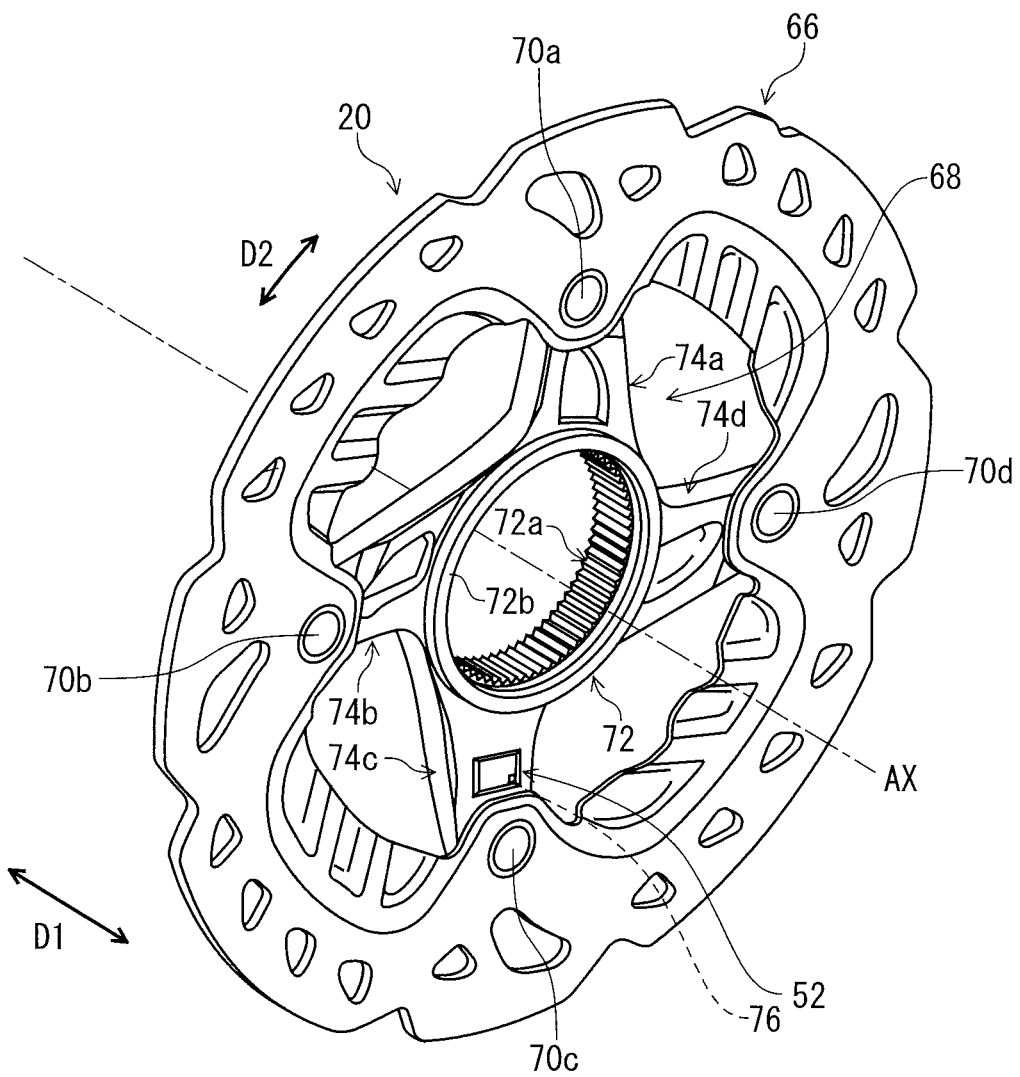
FIG. 7 is a perspective view of a disc brake rotor provided in the disc brake rotor assembly illustrated in FIG. 4.

As illustrated in FIG. 7, the disc brake rotor 20 includes a rotor member 66, a hub mounting member 68 to connect the rotor member 66 to the hub 45 of the small vehicle 2. The disc brake rotor 20 further includes fasteners 70a, 70b, 70c and 70d. The rotor member 66 has a ring shape and serves as an outer peripheral frictional surface of the disc brake rotor 20. The rotor member 66 is preferably made of metallic material such as stainless steel. The rotor member 66 is a separate member with respect to the hub mounting member 68. The hub mounting member 68 is fixedly attached to the rotor member 66 by the fasteners 70a, 70b, 70c and 70d. That is, the rotor member 66 is attached to the hub mounting member 68 by a fastener 70a, 70b, 70c, 70d. The hub mounting member 68 is located radially inward of the rotor member 66 and is configured to be mounted to the hub shell 48. The hub mounting member 68 is preferably made of metallic material such as aluminum alloy or iron. The disc brake rotor 20 is configured to rotate in a circumferential direction D2 about the rotational axis AX.

As seen in FIG. 7, the hub mounting member 68 includes an annular attachment portion 72 and arm portions 74a, 74b, 74c and 74d. The annular attachment portion 72 is configured to be mounted to the hub shell 48 and includes an inner serration portion 72a defining an attachment opening 72b. The inner serration portion 72a is configured to engage with the outer serration portion 48g, thereby the hub shell 48 and the disc brake rotor 20 are integrally rotatable in the circumferential direction D2 of the disc brake rotor 20. However, it will be apparent to those skilled in the small vehicle field, in particular the bicycle field that the other mechanisms configured to couple the disc brake rotor 20 to the hub shell 48 can be applied to the disc brake rotor assembly 12 instead of the outer serration portion 48g and the inner serration portion 72a.

As illustrated in FIG. 7, the arm portions 74a, 74b, 74c and 74d protrude radially outward from the annular attachment portion 72. The arm portions 74a, 74b, 74c and 74d are substantially equally spaced apart in the circumferential direction D2 and are coupled to the rotor member 66 by the fasteners 70a, 70b, 70c and 70d.

As seen in FIGS. 4 and 7, the sensor module 52 is attached to the hub mounting member 68. The sensor module 52 includes at least one rotor state sensor 76 to detect a state of the disc brake rotor 20. That is, the disc brake rotor assembly 12 comprises the at least one rotor state sensor 76 to detect the state of the disc brake rotor 20. More specifically, the at least one rotor state sensor 76 is configured to detect a braking force applied to the disc brake rotor 20. The at least one rotor state sensor 76 is attached to the hub mounting member 68.

Figure 8:
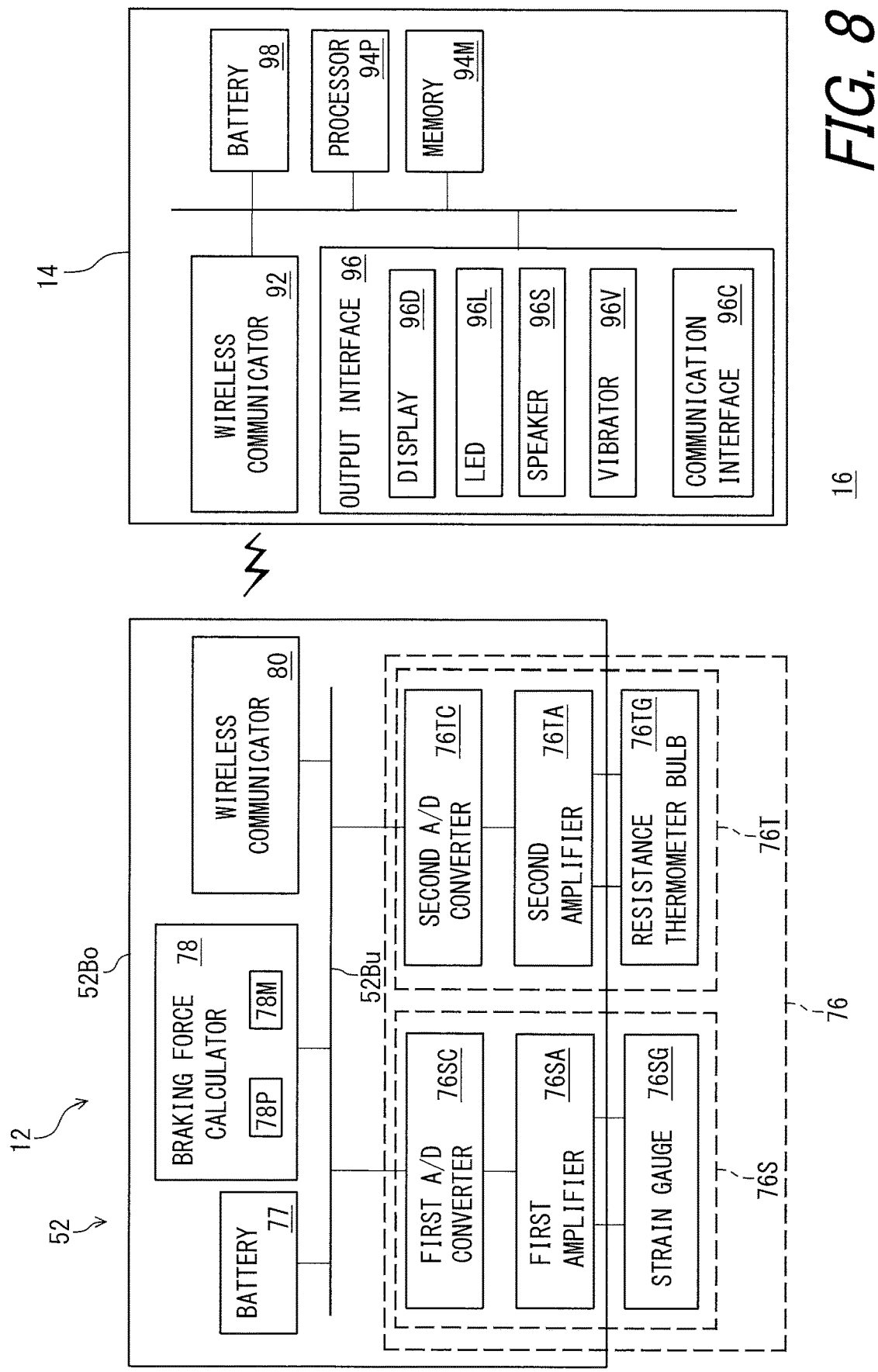
FIG. 8 is a block diagram of an electric device and a sensor module.
Figure 9:
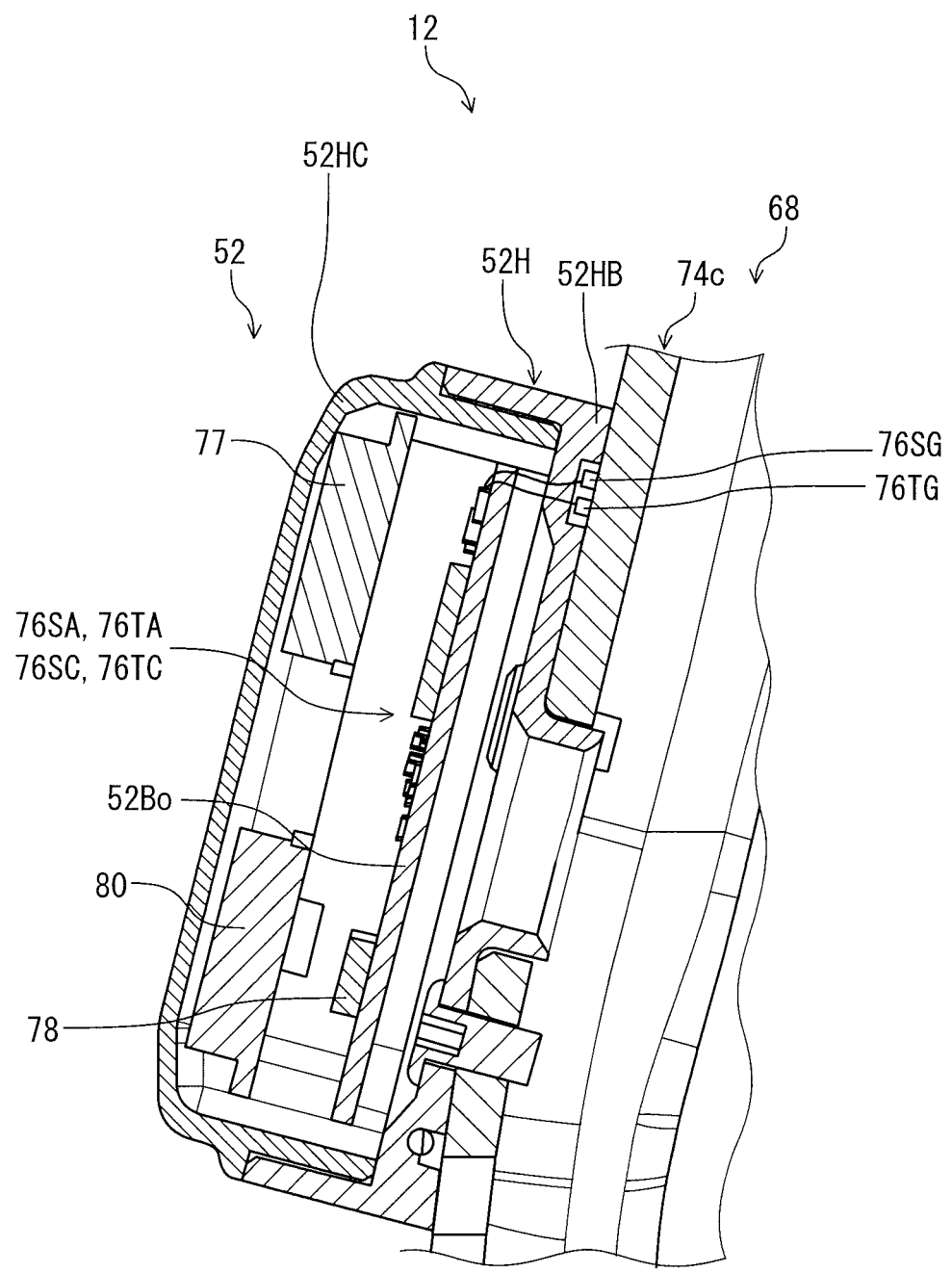
FIG. 9 is a cross-sectional view of the sensor module.

As seen in FIGS. 8 and 9, the sensor module 52 includes a battery 77 to supply electric power to the at least one rotor state sensor 76. The at least one rotor state sensor 76 includes a strain sensor 76S to detect a strain of the hub mounting member 68. The strain sensor 76S includes a strain gauge 76SG, a first amplifier 76SA, and a first A/D converter 76SC. As seen in FIG. 9, the strain gauge 76SG is attached to the hub mounting member 68 to change its resistance value in accordance with the strain of the hub mounting member 68 and its temperature. The battery 77 applies a voltage to the strain gauge 76SG, and the strain gauge 76SG outputs a voltage signal based on its resistance value. Accordingly, the at least one rotor state sensor 76 includes the strain gauge 76SG to detect the strain of the hub mounting member 68. The first amplifier 76SA is configured to amplify the voltage signal output from the strain gauge 76SG. The first A/D converter 76SC is configured to convert analog signals output from the first amplifier 76SA to digital signals.

Further, in a condition where the braking force is applied to the disc brake rotor 20, the hub mounting member 68 expands due to frictional heat, thereby the strain of the hub mounting member 68 is affected by the expansion of the hub mounting member 68. In addition, the frictional heat may change output characteristics of the strain gauge 76SG. So, preferably, the at least one rotor state sensor 76 includes a temperature sensor 76T to detect a temperature of the strain gauge 76SG. The temperature of the strain gauge 76SG detected by the temperature sensor 76T is used to compensate a detection of the strain gauge 76SG to calculate the strain of the hub mounting member 68 precisely. The temperature sensor 76T includes a resistance thermometer bulb 76TG, a second amplifier 76TA, and a second A/D converter 76TC. The resistance thermometer bulb 76TG is attached to the hub mounting member 68 to change its resistance value in accordance with its temperature. Preferably, the resistance thermometer bulb 76TG is provided adjacent to the strain gauge 76SG. The battery 77 applies a voltage to the resistance thermometer bulb 76TG, and the resistance thermometer bulb 76TG outputs a voltage signal based on its resistance value. The second amplifier 76TA is configured to amplify the voltage signal output from the resistance thermometer bulb 76TG. The second A/D converter 76TC is configured to convert analog signals output from the second amplifier 76TA to digital signals.

The sensor module 52 further includes a braking force calculator 78 electrically connected to the at least one rotor state sensor 76. More specifically, the braking force calculator 78 is electrically connected to the first A/D converter 76SC of the strain sensor 76S and the second A/D converter 76TC of the temperature sensor 76T via a bus 52Bu. The braking force calculator 78 is configured to calculate the braking force applied to the disc brake rotor 20 based on outputs from the strain sensor 76S and the temperature sensor 76T. The braking force calculator 78 includes a processor 78P and a memory 78M. The processor 78P and the memory 78M as well as the first amplifier 76SA, and the first A/D converter 76SC, the second amplifier 76TA, and the second A/D converter 76TC are electrically mounted on a circuit board 52Bo. The processor 78P includes a central processing unit (CPU) and a memory controller. The memory 78M is electrically connected to the processor 78P. The memory 78M includes a read only memory (ROM) and a random-access memory (RAM). The ROM includes a non-transitory computer-readable storage medium. The RAM includes a transitory computer-readable storage medium. The memory 78M includes storage areas each having an address in the ROM and the RAM. The processor 78P controls the memory 78M to store data in the storage areas of the memory 78M and reads data from the storage areas of the memory 78M. The memory 78M (e.g., the ROM) stores a program. The program is read into the processor 78P, and thereby functions of the braking force calculator 78 are performed.

For example, the memory 78M stores a table of the braking force applied to the disc brake rotor 20 corresponding to the strain of the hub mounting member 68 and the temperature of the strain gauge 76SG. The program is configured to search the closest strain and the second closest strain to the output of the strain sensor 76S and the closest temperature and the second closest temperature to the output of the temperature sensor 76T to calculate the braking force via linear interpolation based on the corresponding values in the table to the closest strain, the second closest strain, the closest temperature, and the second closest temperature. Alternatively, the braking force calculator 78 can be configured to calculate the braking force applied to the disc brake rotor 20 based on an equation. In such case the memory 78M can include coefficients of the equation. The program is configured to calculate the braking force via the equation based on the output of the strain sensor 76S and the output of the temperature sensor 76T.

The sensor module 52 further includes a wireless communicator 80 electrically connected to the braking force calculator 78 via the bus 52Bu to wirelessly transmit information of the state of disc brake rotor 20 to the electric device 14. That is, the disc brake rotor assembly 12 further comprises the wireless communicator 80 to output information of the state of the disc brake rotor 20. The disc brake rotor assembly 12 further comprises the wireless communicator 80 to transmit information of the state of the disc brake rotor 20 to the electric device 14. The state of the disc brake rotor 20 includes the braking force applied to the disc brake rotor 20. The wireless communicator 80 includes a signal transmitting circuit, a signal receiving circuit, and an antenna. The battery 77 is connected to the wireless communicator 80 to supply electric power to the wireless communicator 80. That is, the disc brake rotor assembly 12 further comprises the battery 77 to supply electric power to the wireless communicator 80 and the at least one rotor state sensor 76.

As seen in FIG. 9, the sensor module 52 further includes a housing 52H. That is, the disc brake rotor assembly 12 further comprises the housing 52H to accommodate at least one of the battery 77 and the wireless communicator 80. In the illustrated embodiment, the housing 52H accommodates the battery 77 and the wireless communicator 80. However, one of the battery 77 and the wireless communicator 80 can be located outside the housing 52H. For example, the battery 77 can be disposed in the hub shell 48, which is described in the second embodiment. As seen in FIGS. 2, 4, 7, and 9, the housing 52H is attached to the hub mounting member 68. More specifically, the housing 52H is attached to the arm portion 74c of the hub mounting member 68. As seen in FIG. 9, the housing 52H includes a base member 52HB secured to the arm portion 74c and a substrate cover 52HC to be detachably attached to the base member 52HB to cover the wireless communicator 80 and the circuit board 52Bo.

As seen in FIG. 8, the brake system 10 comprises the disc brake rotor assembly 12 and the electric device 14. The electric device 14 includes a cycle computer, for example. However, the electric device 14 can include a rider's or driver's smartphone, a rider's or driver's portable audio device, a rider's or driver's smart watch and/or a rider's or driver's wearable terminal (e.g. eye glasses). The electric device 14 includes an additional wireless communicator 92, a processor 94P, a memory 94M, an output interface 96, and a battery 98, which are electrically connected to each other. The additional wireless communicator 92 is configured to receive the information of the state of the disc brake rotor 20 transmitted from the wireless communicator 80. The additional wireless communicator 92 can have substantially the same structure as the wireless communicator 80. The memory 94M is configured to store the information of the state of the disc brake rotor 20 received by the additional wireless communicator 92. The memory 94M includes a read only memory (ROM) and a random-access memory (RAM). The ROM includes a non-transitory computer-readable storage medium. The RAM includes a transitory computer-readable storage medium. The memory 94M includes storage areas each having an address in the ROM and the RAM. The memory 94M can include a removable media (e.g. a memory card) which can be read by a computer. The processor 94P is configured to control the output interface to output the information of the state of the disc brake rotor 20 received by the additional wireless communicator 92. The processor 94P includes a central processing unit (CPU) and a memory controller. The memory 94M (e.g., the ROM) stores a program. The program is read into the processor 94P, and thereby the above function is performed.

The electric device 14 includes an output interface 96 through which the state of the disc brake rotor 20 is output. The output interface 96 includes at least one of a display 96D, a light emitting device (LED) 96L, a speaker 96S, a vibrator 96V, and a communication interface 96C. However, if there will be a different device mounted to the bicycle 2 to output information related to the bicycle 2 in future, the output interface 96 can include such device.

If the electric device 14 includes a global positioning system (GPS) module or can receive a positioning data from a rider's or driver's smartphone, the electric device 14 can be configured to show, in the display 96D, a map with breaking points where the braking force is applied to the disc brake rotor 20. The breaking points can be colored in accordance with strength of the braking force. If the electric device 14 can include the LED 96L as the output interface 96, the LED 96L can be configured to emit a light when the braking force is applied to the disc brake rotor 20, for example. If the electric device 14 can include the speaker 96S as the output interface 96, the speaker 96S can be configured to generate a sound when the braking force is applied to the disc brake rotor 20, for example. If the electric device 14 can include the vibrator 96V as the output interface 96, the vibrator 96V can be configured to vibrate when the braking force is applied to the disc brake rotor 20, for example.

If the electric device 14 includes the communication interface 96C, the communication interface 96C can include a wireless or wired communication interface via which the electric device 14 can communicate with at least one of a rider's or driver's computer, a rider's or driver's smartphone, a rider's or driver's portable audio device, a rider's or driver's smart watch, and a rider's or driver's wearable terminal (e.g. eye glasses). The electric device 14 can control the at least one of the rider's or driver's smartphone, the rider's or driver's portable audio device, the rider's or driver's smart watch, and the rider's or driver's wearable terminal (e.g. eye glasses) to output the state of the disc brake rotor 20. For example, the electric device 14 can control the rider's or driver's computer (smartphone) to show a map with breaking points where the braking force is applied to the disc brake rotor 20. The electric device 14 can control the rider's or driver's portable audio device to generate a sound when the braking force is applied to the disc brake rotor 20. The electric device 14 can control the rider's or driver's smart watch or the rider's or driver's wearable terminal to vibrate when the braking force is applied to the disc brake rotor 20. The battery 98 is connected to the additional wireless communicator 92, the processor 94P, the memory 94M, and the output interface 96 to supply electric power to the additional wireless communicator 92, the processor 94P, the memory 94M, and the output interface 96.

As described above, with the disc brake rotor assembly 12 according to the first embodiment, it is possible to output information related to a rider's or driver's braking operation. Accordingly, riders or drivers can improve their braking abilities by using the disc brake rotor assembly 12.

Modification of First Embodiment

In the first embodiment, the at least one rotor state sensor 76 does not always include both the strain sensor 76S and the temperature sensor 76T. If the strain gauge 76SG is a self-temperature-compensation strain gauge, the at least one rotor state sensor 76 can include only the strain sensor 76S. Conversely, if there is a correlation between the state of the disc brake rotor 20 (e.g. the braking force applied to the disc brake rotor 20) and a temperature of at least one of the rotor member 66 and the hub mounting member 68, the at least one rotor state sensor 76 can include only the temperature sensor 76T. In this case, the at least one rotor state sensor 76 includes the temperature sensor 76T to detect the temperature of at least one of the rotor member 66 and the hub mounting member 68. The resistance thermometer bulb 76TG can be mounted to the at least one of the rotor member 66 and the hub mounting member 68, and the correlation between the state of the disc brake rotor 20 and its temperature can be stored in the memory 78M. The braking force calculator 78 can receive the temperature of the at least one of the rotor member 66 and the hub mounting member 68 from the temperature sensor 76T and refer to the correlation in the memory 78M to calculate the state of the disc brake rotor 20 (e.g. the braking force applied to the disc brake rotor 20).

Second Embodiment

A disc brake rotor assembly 112 in accordance with a second embodiment of the present invention will be described below referring to FIGS. 10 to 14. In the second embodiment, at least one element in the sensor module 52 is disposed in the hub 45. Elements having substantially the same function as those in the first embodiment will be numbered the same here, and will not be described again in detail.

Figure 10:
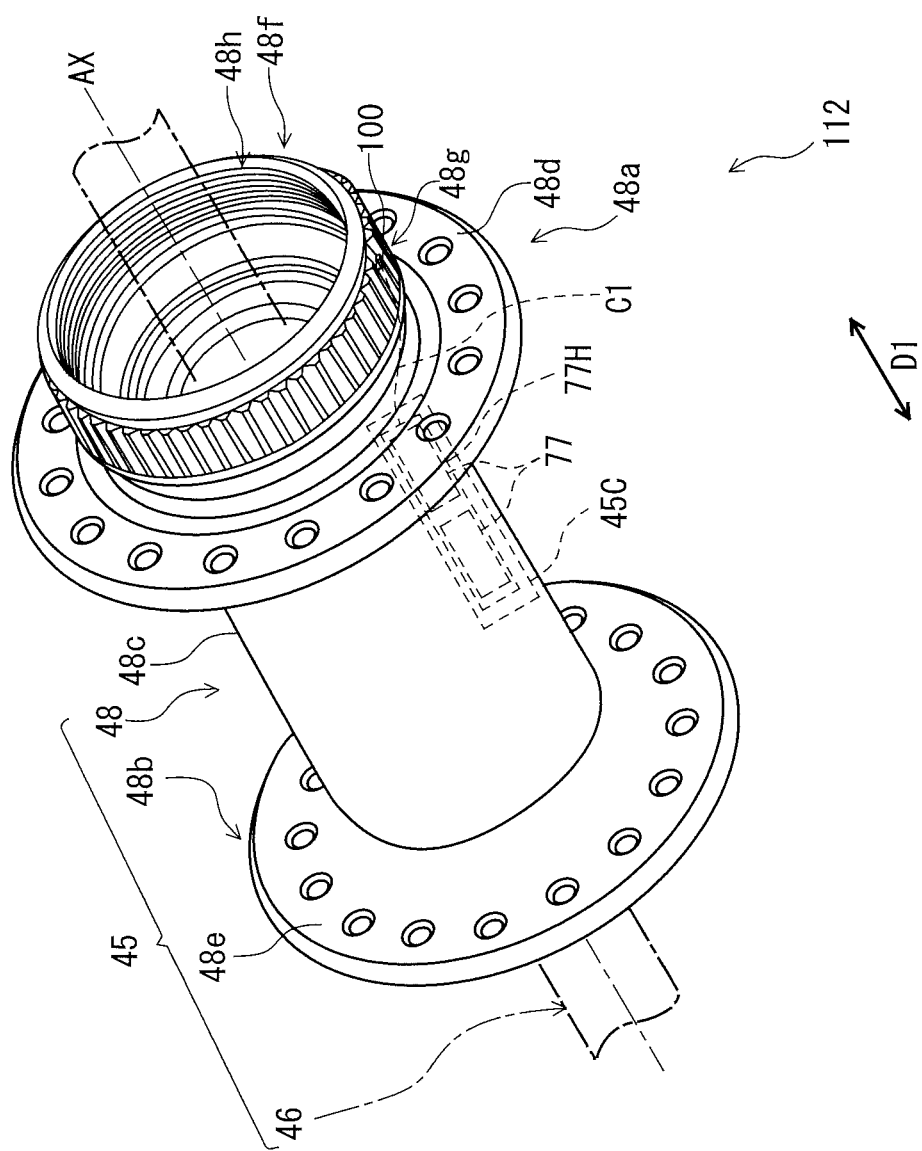
FIG. 10 is a perspective view of a hub shell provided in a disc brake rotor assembly in accordance with a second embodiment.
Figure 11:
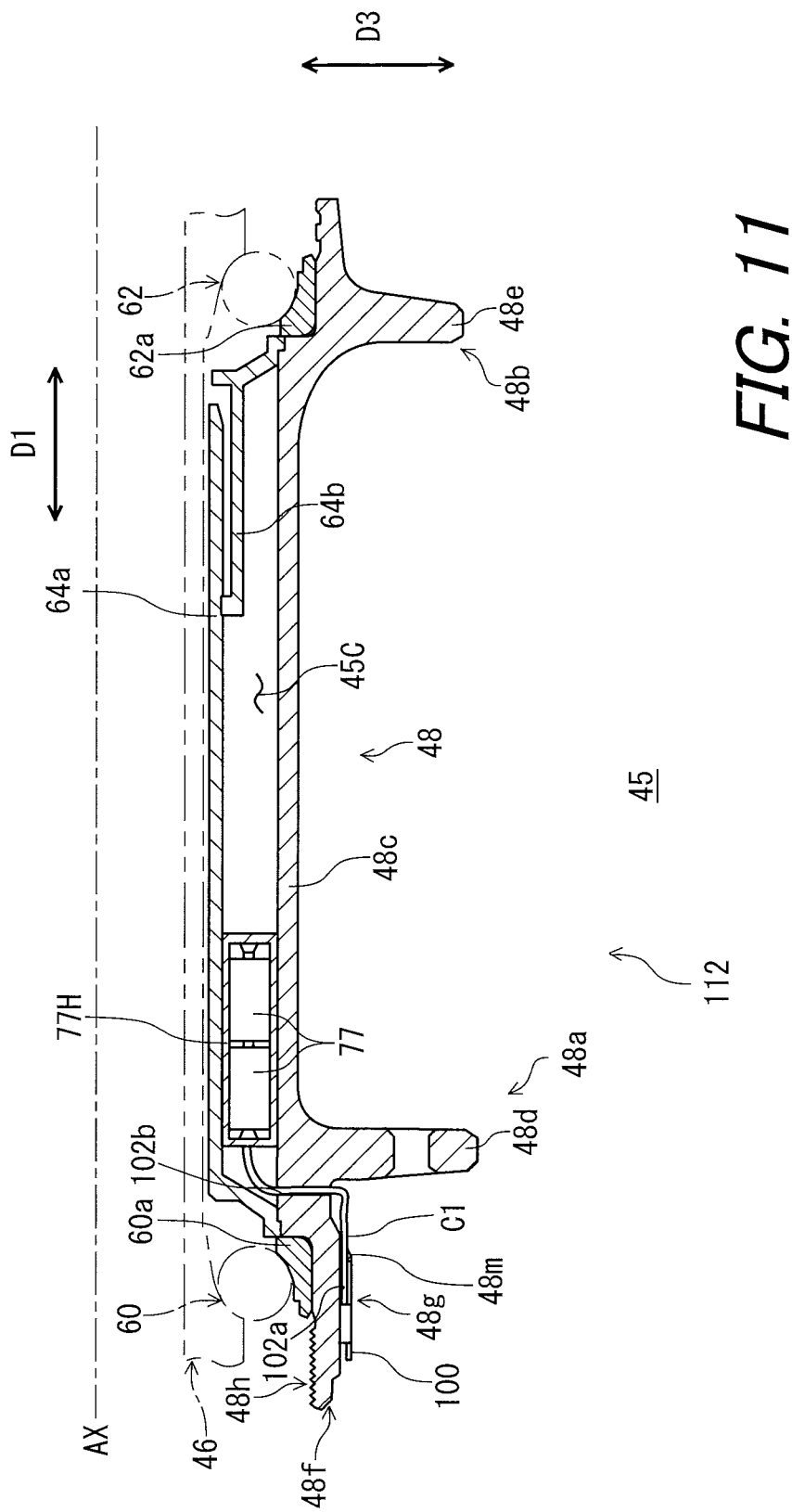
FIG. 11 is a partial cross-sectional view of the hub shell illustrated in FIG. 10.

As seen in FIGS. 10 and 11, the disc brake rotor assembly 112 further comprises a housing 77H to accommodate the battery 77. That is, the disc brake rotor assembly 112 further comprises the housing 77H to accommodate at least one of the battery 77 and the wireless communicator 80. Further, the housing 77H can accommodate at least a part of the braking force calculator 78 (e.g. at least one of the processor 78P and the memory 78M). In this case, the housing 77H may not accommodate the battery 77. As seen in FIG. 10, the disc brake rotor assembly 112 further comprises the hub 45 having a cavity 45C in which the housing 77H is provided. More specifically, the cavity 45C is provided between the center tubular portion 48c and at least one of the first inner tubular member 64a and the second inner tubular member 64b in the radial direction D3.

The disc brake rotor assembly 112 further comprises a first terminal 100 electrically connected to the housing 77H. The first terminal 100 is, for example, a connector. The first terminal 100 is attached to the outer serration portion 48g. That is, the hub 45 has the outer serration portion 48g to which the first terminal 100 is attached. The first terminal 100 is electrically connected to the housing 77H via a first electrical cable C1. The first electrical cable C1 extends through holes 102a and 102b to connect the first terminal 100 and the housing 77H. The first electrical cable C1 can include a power line in a case where the battery 77 is accommodated in the housing 77H and can include a plurality of signal lines in a case where at least a part of the braking force calculator 78 is accommodated in the housing 77H.

Figure 12:
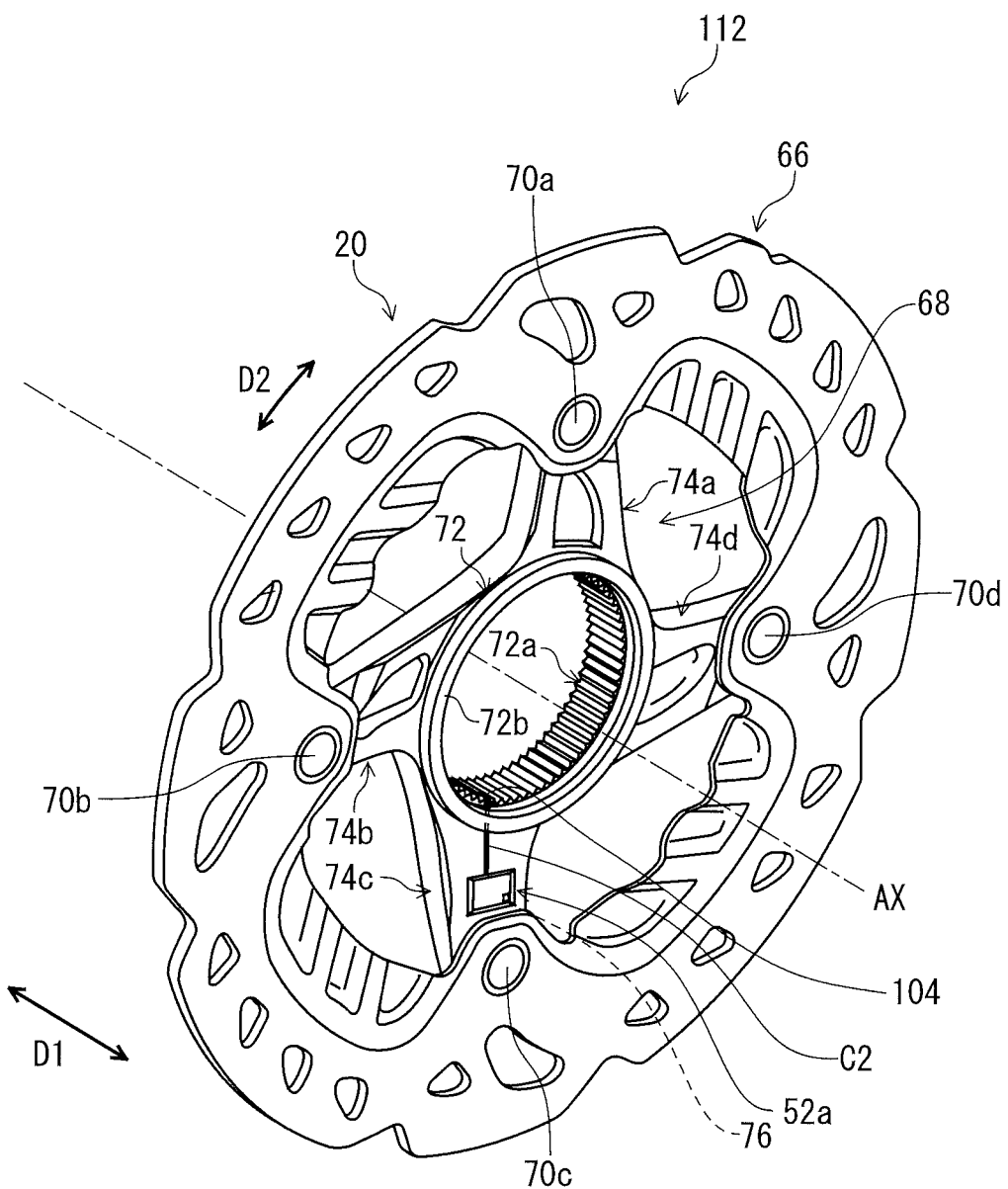
FIG. 12 is a perspective view of a disc brake rotor provided in the disc brake rotor assembly in accordance with the second embodiment.
Figure 13:
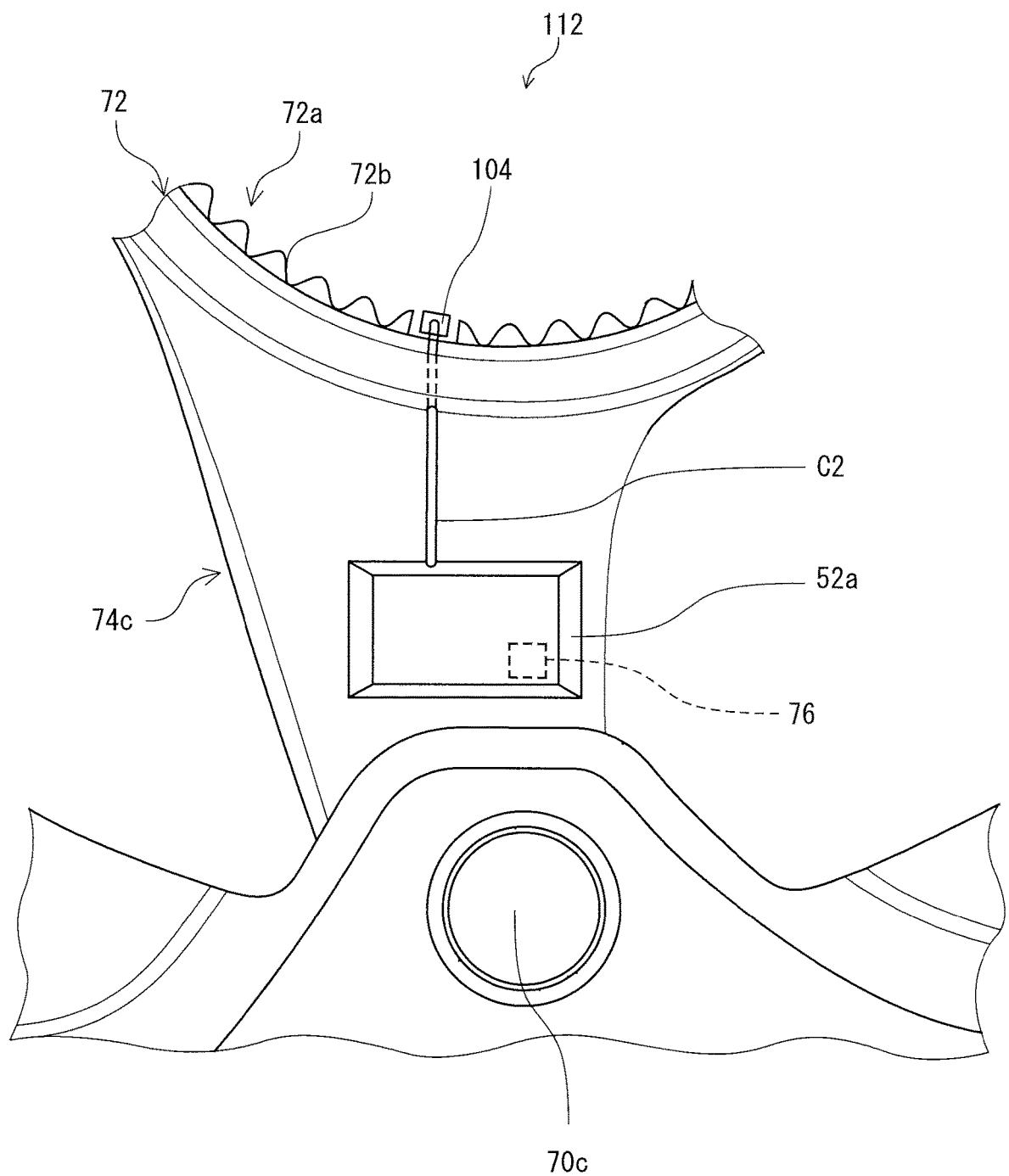
FIG. 13 is a partial enlarged view of the disc brake rotor illustrated in FIG. 12.
Figure 14:
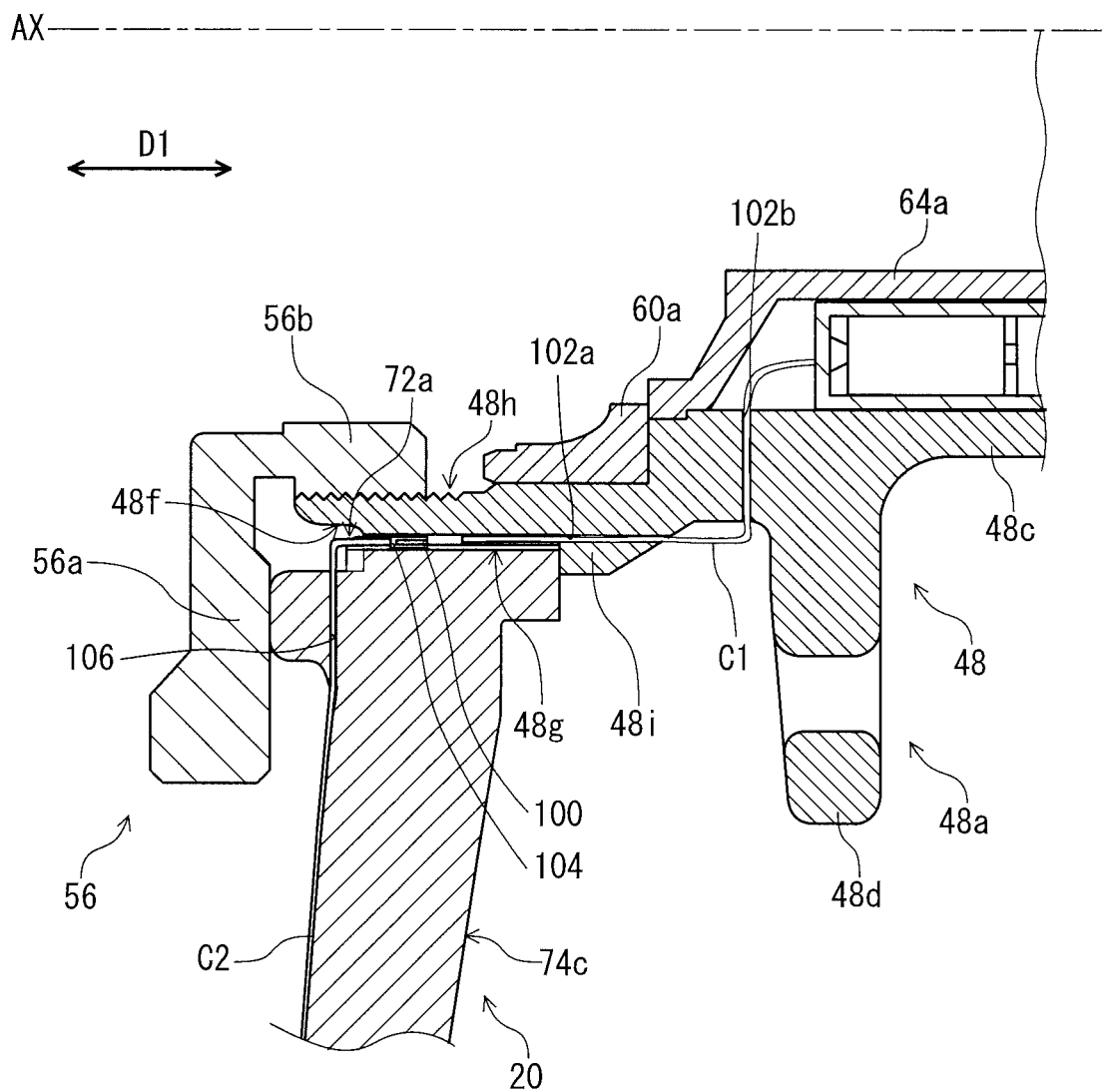
FIG. 14 is a partial cross-sectional view of the disc brake rotor assembly in accordance with the second embodiment.

As seen in FIGS. 12 and 13, the disc brake rotor assembly 112 further comprises a second terminal 104. The second terminal 104 is attached to the inner serration portion 72a. That is, the disc brake rotor 20 has the inner serration portion 72a to which the second terminal 104 is attached. The second terminal 104 is electrically connected to a sensor module 52a. The sensor module 52a includes at least one rotor state sensor 76. The sensor module 52a does not include at least one element accommodated in the housing 77H, but other features of the sensor module 52a are the same as those of the sensor module 52 in the first embodiment. As seen in FIG. 14, the second terminal 104 is, for example, a connector configured to engage with the first terminal 100. Accordingly, the second terminal 104 is electrically connected to the at least one rotor state sensor 76 and the first terminal 100. The second terminal 104 is electrically connected to the sensor module 52a via a second electrical cable C2. The second electrical cable C2 extends through a hole 106 to connect the second terminal 104 and the sensor module 52a. The second electrical cable C2 can include a power line in a case where the battery 77 is accommodated in the housing 77H and can include a plurality of signal lines in a case where at least a part of the braking force calculator 78 is accommodated in the housing 77H.

As described above, the disc brake rotor assembly 112 according to the second embodiment has substantially the same advantageous effect. In addition, it is possible to utilize the cavity 45C in the hub 45 to reduce a size of the sensor module 52a.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake rotor assembly for a small vehicle including a bicycle, comprising:
  a disc brake rotor comprising:
    a rotor member to which braking force is applied; and
    a hub mounting member via which the rotor member is connected to a hub of the small vehicle; and
  at least one rotor state sensor provided directly on the hub mounting member to detect a braking force applied to the disc brake rotor.

2. The disc brake rotor assembly according to claim 1, further comprising:
  a wireless communicator to output information of the state of the disc brake rotor.

3. The disc brake rotor assembly according to claim 2, further comprising:
a battery to supply electric power to the wireless communicator and the at least one rotor state sensor.

4. The disc brake rotor assembly according to claim 3, further comprising:
a housing to accommodate at least one of the battery or the wireless communicator.

5. The disc brake rotor assembly according to claim 4, further comprising:
a hub having a cavity in which the housing is provided.

6. The disc brake rotor assembly according to claim 5, further comprising:
a first terminal electrically connected to the housing; and
a second terminal electrically connected to the at least one rotor state sensor and the first terminal.

7. The disc brake rotor assembly according to claim 4, wherein
the housing accommodates the battery and the wireless communicator.

8. The disc brake rotor assembly according to claim 4, wherein
the housing is attached to the hub mounting member.

9. The disc brake rotor assembly according to claim 1, wherein
the at least one rotor state sensor includes a strain gauge to detect a strain of the hub mounting member.

10. The disc brake rotor assembly according to claim 9, wherein
the at least one rotor state sensor includes a temperature sensor to detect a temperature of the strain gauge.

11. The disc brake rotor assembly according to claim 1, wherein the rotor member is a separate member with respect to the hub mounting member, and the rotor member is attached to the hub mounting member by a fastener.

12. The disc brake rotor assembly according to claim 1, wherein
the at least one rotor state sensor includes a temperature sensor to detect a temperature of the hub mounting member.

13. A brake system comprising:
the disc brake rotor assembly according to claim 1, and
an electric device including an output interface through which the state of the disc brake rotor is output.

14. The brake system according to claim 13, wherein
the disc brake rotor assembly further comprises a wireless communicator to transmit information of the state of the disc brake rotor to the electric device.

15. The disc brake rotor assembly according to claim 1, wherein the hub mounting member comprises:
an attachment portion configured to be mounted to the hub; and
arm portions protruding radially outward from the attachment portion and spaced apart from each other, and
wherein the at least one rotor state sensor provided on at least one of the arm portions.

16. A disc brake rotor assembly for a small vehicle including a bicycle, comprising:
a disc brake rotor;
at least one rotor state sensor to detect a state of the disc brake rotor;
a housing to accommodate at least one of a battery or a wireless communicator;
a hub having a cavity in which the housing is provided;
a first terminal electrically connected to the housing; and
a second terminal electrically connected to the at least one rotor state sensor or the first terminal, wherein,
the hub has an outer serration portion to which the first terminal is attached, and
the disc brake rotor has an inner serration portion to which the second terminal is attached, the inner serration portion being configured to engage with the outer serration portion.

17. The disc brake rotor assembly according to claim 16, wherein
the wireless communicator is configured to output information of the state of the disc brake rotor.

18. The disc brake rotor assembly according to claim 16, wherein
the battery is configured to supply electric power to the wireless communicator and the at least one rotor state sensor.

* * * * *